United States Patent [19]

Patterson

[11] Patent Number: 4,488,612

[45] Date of Patent: Dec. 18, 1984

[54] LIFTING DOLLY FOR HELICOPTERS

[76] Inventor: Thomas A. Patterson, 6959 Halbernt St., Van Nuys, Calif. 91405

[21] Appl. No.: 446,654

[22] Filed: Dec. 3, 1982

[51] Int. Cl.³ .............................................. B64F 1/22
[52] U.S. Cl. .................................. 180/14.1; 180/14.7; 180/904; 244/50; 254/2 R; 280/43.11
[58] Field of Search .................... 180/14.1, 14.2, 14.7, 180/904; 280/35, 43.11, 97, 104; 244/50; 254/2, 133; 414/495, 917

[56] References Cited

U.S. PATENT DOCUMENTS

| 2,326,684 | 8/1943 | Ross | 414/427 |
|---|---|---|---|
| 2,479,100 | 8/1949 | Connor | 254/2 R |
| 4,033,422 | 7/1977 | Benning | 180/14.1 |
| 4,223,856 | 9/1980 | DiVincenzo | 244/50 |

Primary Examiner—David M. Mitchell
Assistant Examiner—Mitchell J. Hill
Attorney, Agent, or Firm—Pretty, Schroeder, Brueggemann & Clark

[57] ABSTRACT

A lifting dolly is provided for quickly and easily lifting a helicopter or the like while on the ground and for transporting the helicopter for maintenance or storage purposes. The lifting dolly comprises a relatively low profile central frame supported for rolling movement by a pair of wheel assemblies and including laterally outwardly pivoting lifting arms for engaging the skid tubes of a helicopter. In use, the dolly is positioned beneath the helicopter and the frame is lowered to rest upon the ground whereupon the lifting arms are pivoted outwardly to press wedge-shaped lifting fingers beneath the skid tubes. Rollers on the underside of the frame permit lateral frame shifting as the fingers engage the skid tubes such that the dolly centers itself between the skid tubes. When the skid tubes are engaged, the frame is elevated by the wheel assemblies to lift the helicopter for convenient rolling movement.

20 Claims, 11 Drawing Figures 4,488,612

LIFTING DOLLY FOR HELICOPTERS

BACKGROUND OF THE INVENTION

This invention relates generally to lifting dollies, and more specifically to a relatively lightweight and easy to use lifting dolly designed for lifting and moving helicopters or the like of the type supported on a pair of skid tubes.

In general, helicopters are manufactured with a skid type landing gear in the form of a relatively lightweight tubular structure for supporting the helicopter air frame or body when the aircraft is on the ground. While the specific design of the tubular landing gear structure varies widely with different helicoper models on the market, the structure normally includes a pair of ground-engageable and generally parallel skid tubes extending longitudinally along opposite sides of the helicopter. In some designs, these skid tubes are secured to one other and to the helicopter air frame by two or more relatively lightweight tubular cross struts. In other helicopter designs, the skid tubes may be secured to the air frame by shock absorber assemblies or the like.

In the absence of rolling landing gear, special handling devices are required to move helicopters while on the ground from one location to another, as is frequently required for movement to or from a storage area or an area of maintenance activity. Such special handling devices normally take the form of a lifting dolly adapted for jacking a helicopter off the ground and then for rolling movement from one place to another. However, the availability of structural lifting points in a helicopter is extremely limited whereby the lifting dolly must be designed to engage the helicopter and be used quickly and easily for lifting and transporting a wide variety of different helicopter models without requiring the use or preinstallation of any special fittings. Moreover, there exists a need for a lifting dolly which can be easily and accurately aligned relative to the helicopter being lifted to insure stable transport. The present inventon fulfills these needs and provides further related advantages.

SUMMARY OF THE INVENTION

In accordance with the invention, an improved lifting dolly is provided for quickly and easily lifting a helicopter or the like while on the ground for movement of the helicopter, for example, to or from a storage or maintenance site. The lifting dolly includes a central frame which carries movable lifting arms adapted to engage the skid tubes of a helicopter substantially independent of the size or transverse spacing of those skid tubes and without contacting structure directly beneath the helicopter air frame. During such engagement, the central frame is laterally movable to center the lifting dolly relative to the longitudinal center of gravity of the helicopter. When the skid tubes are engaged, the central frame is elevated for rolling support on wheels thereby permitting easy and stable transport of the helicopter from one location to another.

In a preferred form of the invention, the central frame of the lifting dolly has a relatively low profile, horizontally oriented rectangular configuration coupled to fore and aft wheel assemblies. The wheel assemblies are pivotally movable relative to the frame to support the frame above the ground for rolling movement on wheels or to permit the frame to rest on the ground with the wheels elevated above the ground.

In use, the dolly is rolled to a position beneath a helicopter between the skid tubes thereof, and the frame is lowered to rest on the ground. The lifting arms, which are pivoted to opposite sides of the frame, are swung outwardly to press wedge-shaped lifting fingers beneath the skid tubes. In the event the frame is not centered between the skid tubes, rollers on the underside of the frame permit lateral shifting thereof to a centered position in reaction to initial engagement between the lifting fingers and the skid tubes. The frame is then elevated by the wheel assemblies to lift the helicopter for rolling transport.

The lifting dolly is advantageously provided as a self-contained unit including means, such as hydraulic rams, for moving the wheel assemblies and the lifting arms relative to the central frame. In addition, the lifting dolly includes a steering assembly operable to turn the wheels of one of the wheel assemblies for steering purposes. Propulsion means, such as an hydraulic motor coupled to at least one of the wheels, may also be provided.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustate the invention. In such drawings.

DETAILED DESCRIPTION OF THE PREFERRED EMBODIMENT

As shown in the exemplary drawings, a lifting dolly designated generally by the reference numeral 10 is provided for quickly and easily lifting a helicopter 12 or the like of the type having a landing gear including a pair of longitudinally extending and substantially parallel skid tubes 14. The lifting dolly 10 includes a plurality of lifting arms 16 which pivot relative to a central frame 18 to press beneath the helicopter skid tubes 14, whereupon the frame 18 can be raised relative to fore and aft wheels 20 and 22 to permit rolling transport of the helicopter from one position to another.

The lifting dolly 10 of this invention is designed to engage and lift the helicopter skid tubes 14 having a variety of different lateral spacings whereby the dolly 10 is usable to lift and transport a wide variety of different helicopter models. Moreover, the lifting dolly 10 advantageously centers itself relative to a longitudinal center of gravity of the helicopter during engagement with the skid tubes to insure that the helicopter is supported in a secure and stable manner. Importantly, contact engagement with the helicopter is limited to the skid tubes 14 without engagement with any other portion of the helicopter, such as cross struts 24 interconnecting the skid tubes or the underside of the normally fragile skin of the air frame 26. Moreover, preinstallation of special fittings on the helicopter itself is not required.

The lifting dolly 10 is illustrated in preferred form in more detail in FIGS. 2-11. As illustrated, the central frame 18 of the lifting dolly has a generally rectangular construction defined by transversely extending cross beams 28 secured at their opposite ends to longitudinally extending side beams 30. For added structural rigidity, a central cross beam 29 may be connected between the midpoints of the side beams 30 and a central support beam 31 may be connected between the midpoints of the cross beams 28.

This rectangular central frame is oriented in a generally horizontal plane with a relatively low profile, with the cross beams 28 sized to permit the frame 18 to fit between the skid tubes 14 of most commercially available helicopter models. In addition, the side beams 30 are sized such that the longitudinal dimension of the central frame 18 is at least slightly less than the longitudinal length of the skid tubes 14 provided with most commercially available helicopter models.

The central frame 18 is supported for rolling movement over the ground by the fore and aft wheels 20 and 22 which are carried respectively by fore and aft wheel assemblies 32 and 34 pivoted to the central frame. More particularly, the fore wheel assembly 32 comprises a subframe defined by a rigidly interconnected plurality of links 33 coupled to the central frame 18 by a pair of horizontally aligned pivot joints 36 which permit pivoting movement of the fore wheel assembly 32 and the fore wheels 20 carried thereby about a horizontal axis. The aft wheel assembly 34 similarly comprises a subframe defined by a rigidly interconnected plurality of links 35 coupled to the central frame 18 by a pair of horizontally aligned pivot joints 38 which permit pivoting motion of the aft wheel assembly 34 and the associated wheels 22 about a horizontal axis.

The pivoting movement of the fore and aft wheel assemblies 32 and 34 functions to raise and lower the central frame 18. More particularly, as viewed in FIGS. 1, 2, 5, and 6, the wheel assemblies 32 and 34 can be pivoted to bring their respective wheels 20 and 22 into rolling contact with the ground and to elevate the frame 18 above the ground. Alternatively, the wheel assemblies 32 and 34 can be pivoted upwardly relative to the frame 18, as illustrated by arrows 39 in FIGS. 6 and 7, to move the frame downwardly to rest on the ground and to move the wheels 20 and 22 to positions spaced above the ground, as viewed in FIG. 7.

The position of the fore and aft wheel assemblies 32 and 34 is controlled, as shown in the exemplary embodiment of the invention, by an hydraulic cylinder assembly 40 including an hydraulic ram 42 linked to the wheel assemblies. As shown best in FIG. 3, this linkage comprises a pivot lever 44 coupled by a pivot pin 46 to the central support beam 31 for pivoting movement in a horizontal plane with respect to the central frame 18, wherein this pivot lever 44 has one end coupled by a pin 45 to the hydraulic ram 42. The opposite end of the pivot lever 44 is connected by additional pivot pins 47 and 48 spaced from the pin 46 to follower links 50 and 52 which in turn have opposite ends connected by horizontally oriented pivot joints 54 and 56 to upper portions of the fore and aft wheel assemblies 32 and 34.

Figure 1:
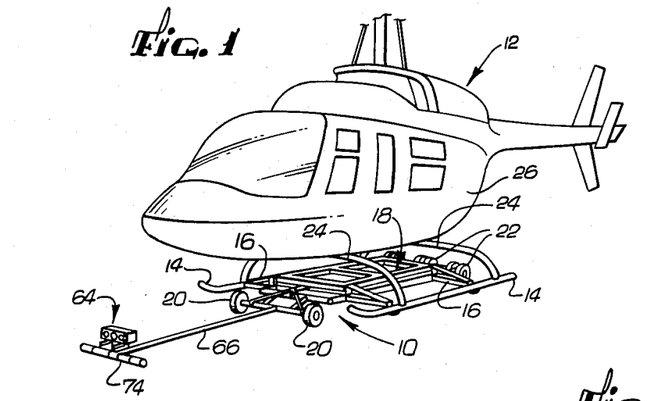
FIG. 1 is a perspective view illustrating a lifting dolly embodying the novel features of the present invention supporting a helicopter for transport while on the ground.
Figures 2, 4:
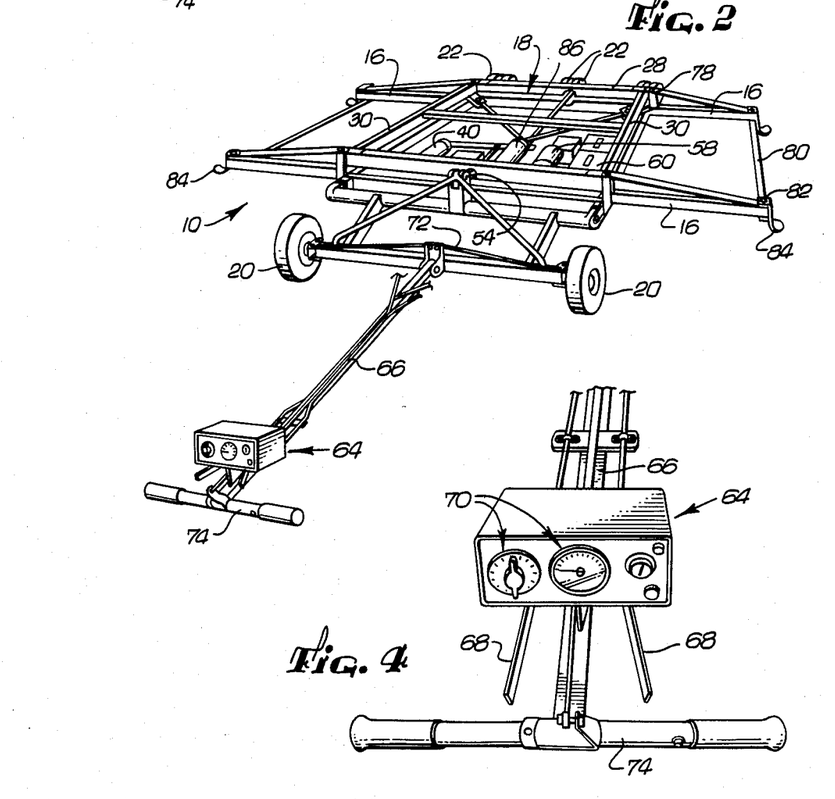
FIG. 2 is an enlarged perspective view of the lifting dolly illustrating lifting arms thereof in an extended position.
FIG. 4 is an enlarged fragmented perspective view illustrating a control unit and a portion of a steering mechanism for the lifting dolly.
Figure 3:
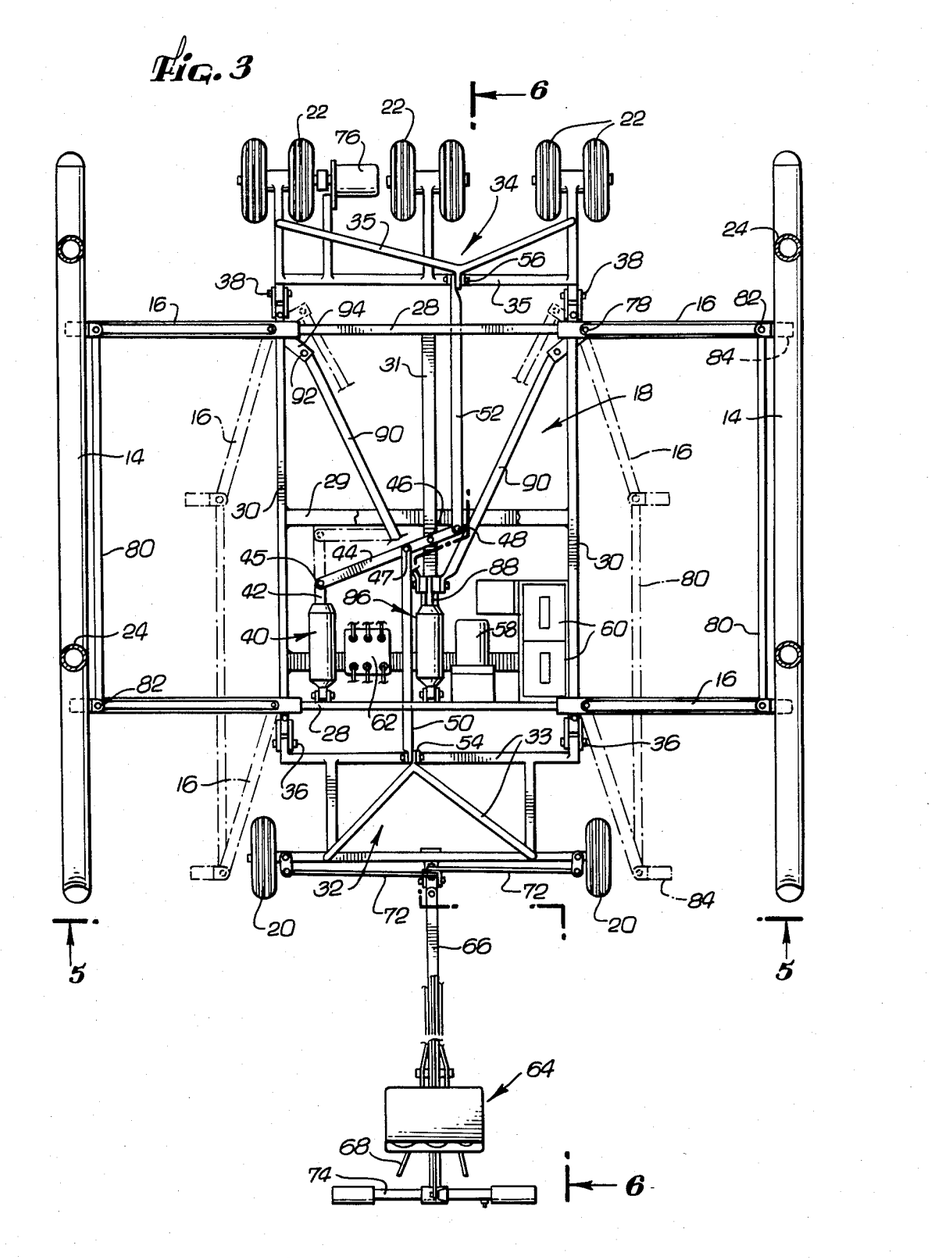
FIG. 3 is an enlarged top plan view of the lifting dolly illustrating movement of the lifting arms between retracted and extended positions for engagement with skid tubes of a helicopter.
Figure 5:
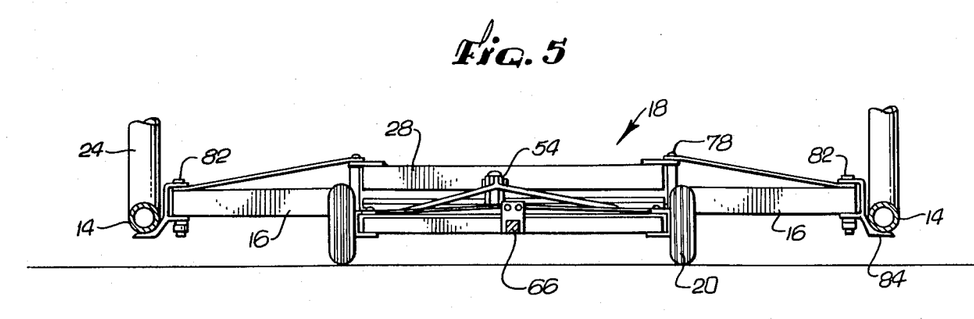
FIG. 5 is a generally front elevation view of the lifting dolly taken on the line 5—5 of FIG. 3 and illustrating support of helicopter skid tubes in an elevated position.
Figure 6:
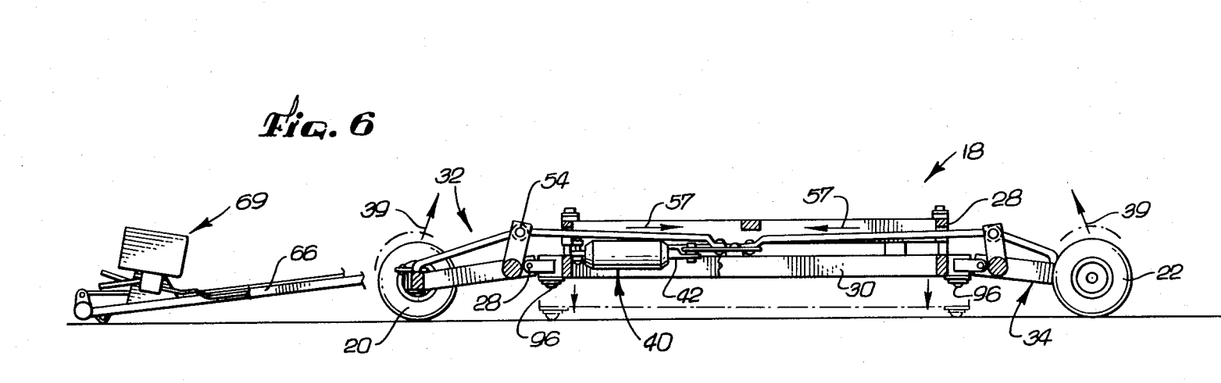
FIG. 6 is a longitudinal vertical section of the lifting dolly taken generally on the line 6—6 of FIG. 3 and illustrating movement of a central frame relative to fore and aft wheel assemblies.
Figure 7:
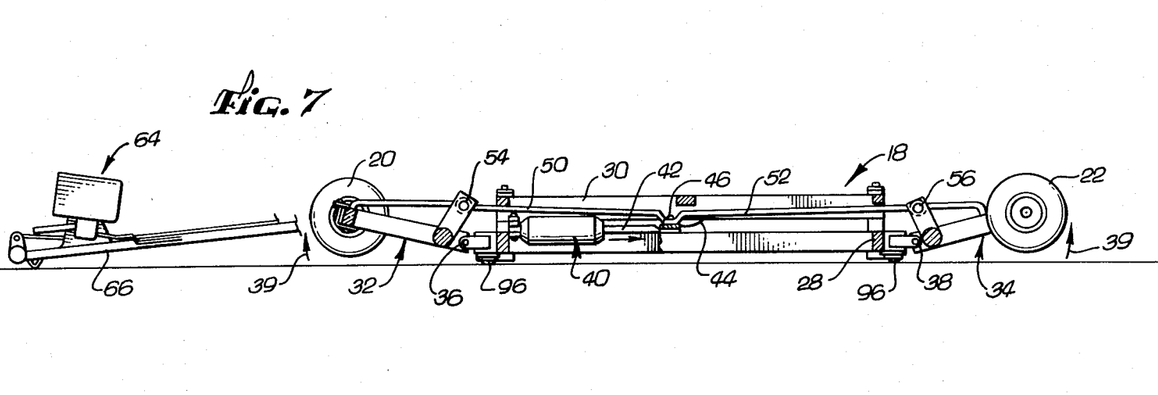
FIG. 7 is a longitudinal vertical section similar to FIG. 6 and illustrating further relative movement between the central frame and the wheel assemblies.
Figure 8:
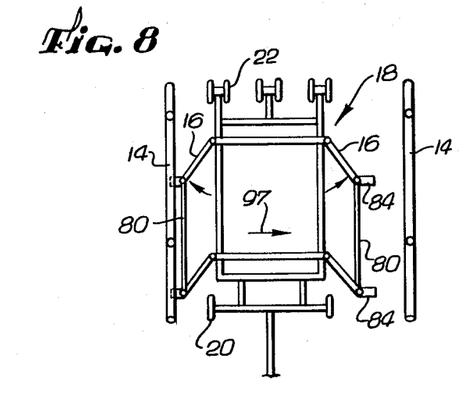
FIGS. 8 and 9 are somewhat schematic top plan views illustrating centering of the lifting dolly during engagement, with skid tubes of a helicopter.
Figure 9:
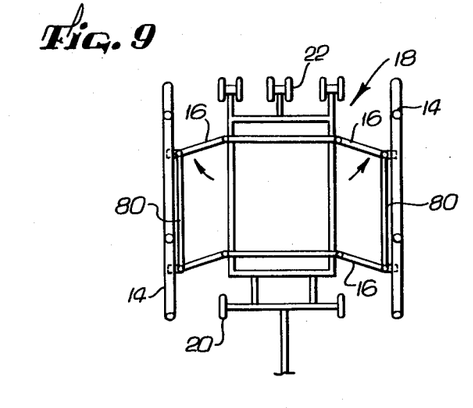

With this construction, extension of the hydraulic ram 42 moves the pivot lever 44 from a retracted position, shown in FIG. 6 and in solid lines in FIG. 2, to an extended position, shown in FIG. 7 and in dotted lines in FIG. 3. This ram movement draws the two follower links 50 and 53 in the direction of arrows 57 (FIG. 6) to elevate the fore and aft wheel assemblies 32 and 34 relative to the central frame 18, thereby lifting the wheels 20 and 22 off the ground and allowing the frame 18 to rest on the ground (FIG. 7). Conversely, retraction of the hydraulic ram 42 reverses the direction of movement of the follower links 50 and 52 to lower the wheel assemblies 32 and 34 relative to the frame. This latter movement returns the wheels 20 and 22 to rolling contact with the ground and elevates the frame above the ground.

Pressurized hydraulic fluid for the hydraulic cylinder assembly 40 is supplied by an hydraulic pump 58 (FIG. 3) carried directly upon the central frame wherein this pump can be driven electrically by power obtained from storage batteries 60 or the like also installed directly upon the central frame. The pump 58 supplies pressurized hydraulic fluid to a control selector valve 62 which is operated to control extension or retraction of the ram 42 of the hydraulic cylinder 40. Such control of the selector valve 62 is conveniently obtained by means of a controller unit 64 carried in an accessible position on a steering bar 66 at the front of the dolly, wherein the controller unit includes appropriate operating handles 68 and dials 70 to control energization of the pump 58 and to control the setting of the selector valve 62.

The steering bar 66 comprises a portion of a conventional steering mechanism linked by tie rods 72 to the fore wheel assembly 32 to angularly adjust the directional setting of the front wheels 20. An easily grasped handlebar 74 is conveniently provided at the front of the steering bar 66 to facilitate manual turning of the bar 66 to control the position of the wheels 20 and thereby also control the direction of movement of the dolly 10, all in a well-known manner.

With the wheels 20 and 22 in rolling contact with the ground, the dolly 10 may thus be rolled about in the desired direction to pick up and transport a helicopter, as will be described. Motive power for this rolling movement, in the preferred embodiment, is advantageously obtained from a relatively small hydraulic motor 76 drivingly coupled to one of the supporting wheels 20 and 22, such as one of the aft wheels 22, as shown in FIG. 3. Pressurized hydraulic fluid for this motor 76 is supplied by the pump 58 through the selector valve 62, in response to appropriate setting of the controller unit 64.

Figure 10:
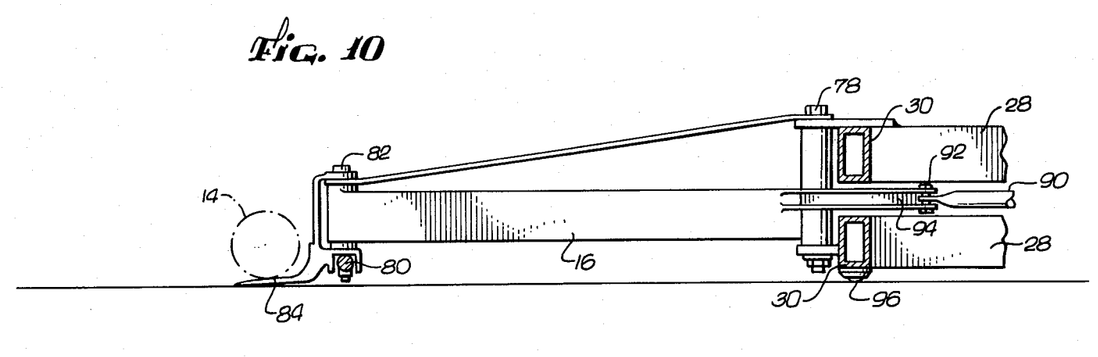
FIG. 10 is an enlarged fragmented vertical section of a portion of the lifting dolly illustrating further construction details of an exemplary lifting arm pivoted to the central frame.
Figure 11:
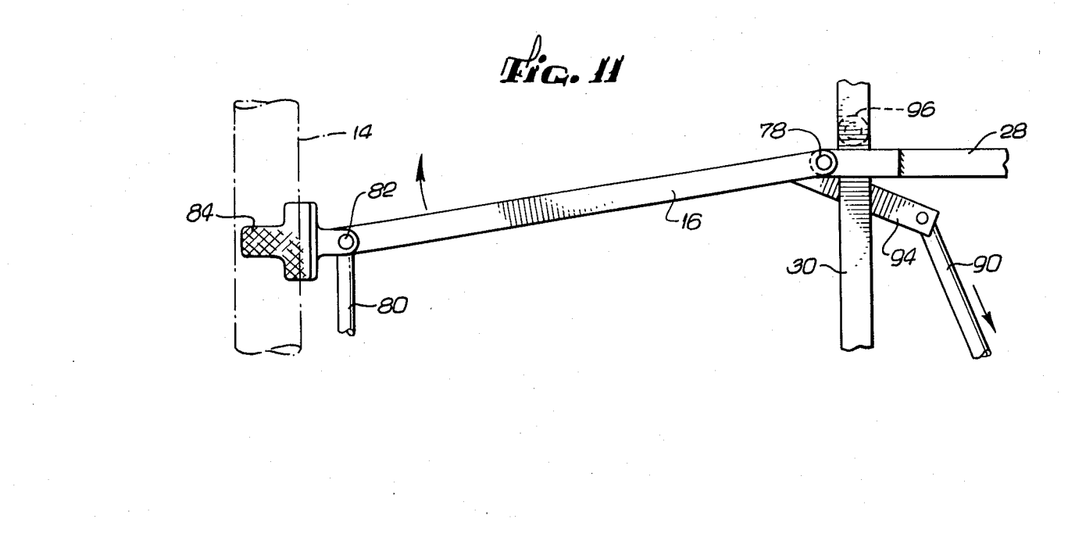
FIG. 11 is an enlarged fragmented top plan view of a portion of the lifting dolly illustrating the mechanical linkage connection and movement of an exemplary lifting arm relative to the central frame.

The lifting dolly 10 is rolled to a position beneath a helicopter 12 generally between the skid tubes 14 whereupon the central frame 18 is lowered to a position resting on the ground to correspondingly lower the lifting arms 16 for engagement of the skid tubes. These lifting arms 16, as shown best in FIGS. 3, 10, and 11, are coupled respectively by vertically oriented pivot joints 78 to the four corners of the central frame 18. Two lifting arms 16 are thus disposed on each side of the central frame 18, and these lifting arms 16 are constrained for movement as opposite links of a parallelogram by a tie bar 80 connected pivotally by pins 82 between the laterally outer ends of the lifting arms 16. The tie rods 80, as shown best in FIGS. 10 and 11, are rigidly secured as by welding or the like to a pair of lifting fingers 84 in the form of generally wedge-shaped and laterally outwardly projecting lifting platforms which slide on the ground when the central frame 18 rests on the ground such that the lifting fingers slide underneath the skid tubes 14 of the helicopter.

The lifting arms 16 at each side of the central frame 18 are pivoted together for simultaneous movement from a retracted position, shown in dotted lines in FIG. 3 to an extended position, shown in full lines in FIGS. 3, 10, and 11, by a second hydraulic cylinder assembly 86 carried near the front of the central frame and including a ram 88 coupled to a pair of rearwardly extending control links 90. These control links 90 are in turn pivoted by pins 92 at their rearmost ends to a pair of relatively short crank links 94 fastened to the lifting arms 16 near their respective pivot joints 78. The second hydraulic cylinder assembly 86 is also supplied with pressurized fluid from the pump 58 via the selector valve 62 and in response to the setting of the controller unit 62. Thus, when it is desired to move the lifting arms 16 to their extended positions, the controller unit 64 is appropriately set to retract the hydraulic ram 88 rearwardly to pivot the arms outwardly in unison.

According to an important feature of the invention, the central frame 18 centers itself relative to a central longitudinal axis of the helicopter 12 during the above-described positioning of the lifting fingers 84 beneath the skid tubes 14. More particularly, as shown in FIG. 7, with the fore and aft wheels 20 and 22 elevated, the central frame 18 is supported on the ground by a plurality of small rollers or casters 96 mounted to the underside of the frame near the four corners thereof. If the frame is positioned off-center between the two skid tubes 14, as viewed in FIG. 8, the lifting fingers 84 at one side of the frame contact the associated skid tube prior to the lifting arms at the other side of the frame, whereupon this initial contact causes the frame to slide on the rollers 96 in the direction of arrow 97 toward a centered position, as viewed in FIG. 9, at which time all of the lifting fingers are in engagement with the skid tubes and begin to press beneath the tubes.

With the lifting fingers 88 in place beneath the skid tubes 14, the fore and aft wheel assemblies 32 and 34 are lowered in response to actuation of the hydraulic cylinder assembly 40 to return the wheels 20 and 22 into engagement with the ground. This returns the central frame 18 to an elevated position spaced above the ground and correspondingly lifts the extended lifting arms 16 to positions spaced above the ground thereby lifting the skid tubes 14 and the helicopter 12. If desired, to insure that the lifting arms 16 are capable of supporting the weight of the helicopter, braces 98 may be coupled between the pivot joints 78 and 82 at the opposite ends of each lifting arm. When the helicopter is lifted above the ground, the dolly 10 can be rolled from one position to another with appropriate directional control provided by the steering mechanism 66 and motive power provided by the hydraulic motor 76.

When the helicopter is transported to the desired new location, the dolly 10 is quickly and easily disengaged from the helicopter by returning the fore and aft wheel assemblies 32 and 34 to elevated positions thereby lowering the frame 18 and the lifting arms 16 to rest upon the ground. The lifting arms 16 are then retracted by extension of the ram 88 the second hydraulic cylinder assembly 86 to disengage the lifting fingers 84 from the skid tubes 14 thereby disengaging the dolly from the helicopter. The wheel assemblies 32 and 34 can then be lowered to reelevate the central frame 18 thereby permitting rolling movement of the dolly from beneath the helicopter.

The lifting dolly 10 of this invention thus provides an easy to use and lightweight lifting dolly which can be used to lift and transport helicopters or the like having skid type landing gear irrespective of the particular helicopter model and without requiring any specialized hardware or adaptor fittings to be installed on the helicopter. Moreover, the dolly 10 is designed to lift the helicopter safely without damage and for transport in a highly stable manner.

While the lifting dolly 10 of this invention has been described in the foregoing description and illustrated in the accompanying for use in lifting helicopters, it should be undersrood that the dolly can be used for lifting and transporting a variety of structures, particularly those having skidlike support devices. Moreover, a variety of modifications and improvements to the lifting dolly described herein are believed to be apparent to one of ordinary skill in the art. Accordingly, no limitation on the invention is intended. except by way of the appended claims.

What is claimed is:

1. A lifting dolly for lifting and transporting a helicopter or the like supported on the ground by a spaced pair of generally parallel skids, comprising:
a generally horizontally oriented central frame having a width less than the spacing between the skids, a length generallv less than the lengths of the skids, and a plurality of rollers mounted at the underside thereof;
a plurality of wheels coupled to said frame;
means for adjusting the elevation of said frame relative to said wheels between a first position with said frame elevated above the ground and said wheels in rolling contact with the ground and a second position with said rollers resting on the ground;
a plurality of lifting arms coupled generally to opposite sides of said frame and movable between retracted and laterally outwardly extended positions relative to said frame, each of said lifting arms carrying a lifting finger positioned generally on the ground when said frame is in said second position for pressing beneath an associated one of the skids; and means for moving said lifting arms in unison toward said extended positions when said frame is located between the skids and disposed in said second position to press said lifting fingers beneath the skids, said rollers accommodating lateral shifting of said frame toward a centered position between the skids as said lifting fingers press beneath the skids, said frame elevation adjusting means being thereupon operable to move said frame to said first position thereby lifting the helicopter off the ground.

2. The lifting dolly of claim 1 wherein said frame has a generally rectangular configuration oriented with a relatively low vertical profile in a generally horizontal plane.

3. The lifting dolly of claim 1 including a pair of wheel assemblies mounted generally to opposite ends of said frame for pivoting movement with respect to a generally horizontal axis, said wheel assemblies each including a plurality of said wheels, and said frame elevation adjusting means being coupled between said frame and each of said wheel assemblies for pivoting said wheel assemblies relative to said frame.

4. The lifting dolly of claim 1 including means for rotarably driving at least one of said wheels for propelling the dolly when said frame is in said first position.

5. The lifting dolly of claim 4 including means for controlling the operation of said driving means, said frame elevation adjusting means, and said lifting arm moving means.

6. The lifting dolly of claim 5 wherein said controlling means, said driving means, said frame elevation adjusting means, and said lifting arm moving means are mounted on the dolly for transport therewith.

7. The lifting dolly of claim 1 wherein at least two of said lifting arms are mounted at each of the opposite sides of said frame for generally horizontal pivoting motion, said at least two lifting arms being interconnected by a tie bar to constrain said arms for movement generally as opposite links of a parallelogram.

8. The lifting dolly of claim 7 wherein said tie bar is interconnected between said at least two lifting arms generally at the ends thereof opposite said frame, said lifting fingers associated with said at least two lifting arms being secured to said tie bar to project generally laterally outwardly relative to said frame.

9. The lifting dolly of claim 1 wherein each of said lifting fingers has a laterally outwardly presented, generally wedge-shaped contour for pressing beneath and lifting the associated skid.

10. The lifting dolly of claim 1 wherein said lifting arm moving means includes means for maintaining said lifting fingers in substantially uniformly spaced relation from the associated side of said frame.

11. The lifting dolly of claim 1 wherein said frame elevation adjusting means is operable to elevate said wheels out of rolling contact with the ground when said frame is in said second position.

12. A lifting dolly for lifting and transporting apparatus supported on the ground by a spaced pair of generally parallel skids, comprising:

a generally horizontally oriented frame having a width less than the spacing between the skids;
a plurality of rolling members coupled to said frame;
means for adjusting the elevation of said frame between a first position elevated above the ground and a second position relatively lower than said first position;

a plurality of lifting arms coupled generally to opposite sides of said frame and movable between retracted and laterally outwardly extended positions and each carrying a lifting finger positioned generally on the ground when said frame is in said second position for pressing beneath an associated one of the skids; and means for moving said lifting arms toward said extended positions when said frame is located between the skids and disposed in said second position to press said lifting fingers beneath the skids, said frame elevation adjusting means being thereupon operable to move said frame to said first position thereby lifting the apparatus off the ground.

13. The lifting dolly of claim 12 wherein said rolling members are adapted to accommodate lateral shifting movement of said frame toward a centered position between the skids as said lifting fingers are pressed beneath the skids.

14. The lifting dolly of claim 12 wherein said lifting arm moving means includes means for maintaining said lifting fingers in substantially uniformly spaced relation from the associated side of said frame.

15. The lifting dolly of claim 12 wherein said rolling means comprises a plurality of wheels for supporting said frame for rolling movement over the ground when said frame is in said first position, and a plurality of rollers mounted on the underside of said frame for supporting said frame for lateral shifting movement when said frame is in said second position.

16. The lifting dolly of claim 12 including means for steering the dolly.

17. The lifting dolly of claim 12 including means for propelling the dolly, said propelling means, said frame elevation adjusting means, and said lifting arm moving means being mounted on the dolly for transport therewith.

18. The lifting dolly of claim 16 wherein at least two of said lifting arms are coupled to each of the opposite sides of said frame, and including means for maintaining said lifting fingers associated with said at least two lifting arms in spaced relation to each other by a distance less than the lengths of the skids.

19. A lifting dolly for lifting and transporting a helicopter or the like supported on the ground by a spaced pair of generally parallel skids, comprising:

a generally horizontally oriented central frame having a width less than the spacing between the skids, a length generally less than the lengths of the skids, and a plurality of rollers mounted at the underside thereof;
a fore wheel assembly coupled generally to the front end of said frame for pivoting motion generally about a horizontal axis and including a plurality of fore wheels;
an aft wheel assembly coupled generally to the rear end of said frame for pivoting motion generally about a horizontal axis and including a plurality of aft wheels;
means for pivoting said fore and aft wheel assemblies relative to said frame for moving said frame between a first position elevated above the ground with said fore and aft wheels in rolling contact with the ground and a second position with said rollers resting on the ground and said fore and aft wheels generally out of rolling contact with the ground;

a plurality of generally identical lifting arms coupled to opposite sides of said frame with at least two of said lifting arms at each of said opposite sides, said lifting arms being pivotal relative to said frame generally within a horizontal plane;

means for constraining said lifting arms at each of the opposite sides of said frame for pivoting movement together between retracted and laterally outwardly extended positions;

a laterally outwardly extending and generally wedge-shaped lifting finger carried by each of said lifting arms generally at the end thereof opposite said frame;

means for moving said lifting arms in unison between said retracted and extended positions thereby maintaining said lifting fingers carried by said lifting arms in generally uniformly spaced relation from the associated side of said frame, said lifting fingers being disposed when said frame is located between the skids and disposed in said second position to press against the skids initially to laterally shift said frame on said rollers to center said frame between the skids and then to press substantially simultaneously to a lifting position beneath the skids, said frame elevation adjusting means being thereupon operable to move said frame to said first position to lift the helicopter;

means for directionally adjusting one of said pluralities of fore and aft wheels for steering the dolly; and means for driving one of said pluralities of fore and aft wheels for propelling the dolly;

said driving means, said frame elevation adjusting means, and said lifting arm moving means being carried by the dolly for transport therewith.

20. The lifting dolly of claim 19 wherein said driving means comprises an hydraulic motor drivingly coupled to at least one of the wheels of said one of said pluralities of fore and aft wheel assemblies, said frame elevation adjusting means comprises a first hydraulic cylinder assembly coupled between said frame and said fore and aft wheel assemblies, said lifting arm moving means comprises a second hydraulic cylinder assembly coupled between said frame and said lifting arms, and further including an hydraulic pump on said frame, a selector valve coupled between said hydraulic pump and each of said hydraulic motor and said first and second hydraulic cylinder assemblies, and a controller for selectively controlling operation of said selector valve.

* * * * *